Feb. 28, 1933.  W. J. FLETCHER  1,899,411
STOPPER TOP AND METHOD OF MAKING THE SAME
Filed March 20, 1930  6 Sheets-Sheet 1

Inventor
WALTER J. FLETCHER
By his Attorneys
Cooker, Kerr and Dunham

Feb. 28, 1933.     W. J. FLETCHER     1,899,411
STOPPER TOP AND METHOD OF MAKING THE SAME
Filed March 20, 1930     6 Sheets-Sheet 2

Inventor
WALTER J. FLETCHER
By his Attorneys
Cooker, Kerr and Dunham

Feb. 28, 1933. W. J. FLETCHER 1,899,411
STOPPER TOP AND METHOD OF MAKING THE SAME
Filed March 20, 1930 6 Sheets-Sheet 3

Inventor
WALTER J. FLETCHER
By his Attorneys
Cooper, Kerr and Dunham

Feb. 28, 1933.   W. J. FLETCHER   1,899,411
STOPPER TOP AND METHOD OF MAKING THE SAME
Filed March 20, 1930   6 Sheets-Sheet 5

Inventor
WALTER J. FLETCHER
By his Attorneys
Cooper, Kerr and Dunham

Feb. 28, 1933. W. J. FLETCHER 1,899,411
STOPPER TOP AND METHOD OF MAKING THE SAME
Filed March 20, 1930 6 Sheets-Sheet 6

Inventor
WALTER J. FLETCHER
By his Attorneys
Cooper, Kerr and Dunham

Patented Feb. 28, 1933

1,899,411

UNITED STATES PATENT OFFICE

WALTER J. FLETCHER, OF ALBANY, NEW YORK, ASSIGNOR TO THE EMBOSSING COMPANY, OF ALBANY, NEW YORK, A CORPORATION OF NEW YORK

STOPPER-TOP AND METHOD OF MAKING THE SAME

Application filed March 20, 1930. Serial No. 437,330.

This invention relates to wooden stopper-tops and to the method of making the same.

In the art of making wooden stopper-tops by compression of a wooden disk-like blank radially and endwise of the grain, difficulty has been encountered in some cases in producing tops which are uniformly sound, free from even incipient cracks or fissures, possessing adequate mechanical strength, and of perfect finish or design. Thus in making thin tops of large area, as for example thin tops of oblong or domino shape in plan, and tops in which the fibers must be greatly distorted or displaced, as is necessary in producing a cameo design of high relief, or thick dome-shaped tops, or tops with rounded edges, the stresses to which the blanks are subjected in undergoing the compression and extensive molding required to shape them to the configuration of the face-dies often exceed the cohesion or adhesion of the fibres of the wood at one point or another in the blanks, sometimes at a number of points, with the result that the tops come out of the dies distorted or cracked or internally weakened or defective in finish or design, or otherwise imperfect. The shaping of the face or faces of the blank is effected by upper and lower dies, and the initial compression of the blank radially is most conveniently effected by pushing the blank into a tubular die or die-hole of less cross-sectional area. When the blank is pushed or advanced in the die-hole by one of the face-dies the tendency to produce the defects noted is much greater; but because of the fact that the compression and shaping take place entirely out of sight (inside of the die-hole) the causes of the defects cannot be determined by observing what happens, and when, as the blanks pass down the die-hole and are subjected to the endwise compression of the face-die or dies.

It is, therefore, among the objects of the invention to produce sound stopper-tops of the character described and a method of manufacturing the same by which such stopper-tops may be produced without the defects alluded to.

Another object of my invention is to provide wooden stopper-tops having designs in relief which are producible by intaglios on their obverse sides and impression for seating the heads of stoppers on their reverse sides, and a novel method of making the same.

Another object of my invention is to provide an improved hardened stopper-top and a method for fabricating the same by which it is possible to carry the pressure operative upon a wooden blank to such a degree as to cause the matting and the compacting of the material of the blank throughout its volume and in such regions as to cause the production of barriers whereby the inception and propagation of cracks is prevented and the strength of the finished product is greatly increased in comparison with its original strength in blank form.

Another object of my invention is to provide a simple and efficient method of making improved stopper-tops which enables the manufacture of stopper-tops in quantity and with unfailing soundness and accuracy. To these and other ends the invention consists in the novel articles of manufacture and method and apparatus for making the same hereinafter described.

As a result of prolonged study and experimentation I have found that the difficulties described can be overcome by correlating the face-dies in respect to the configuration of the faces thereof, in such manner that as the blank enters the converging orifice of the die-hole and is advanced therein the pressure on the central portions of the blank is balanced by the pressure on the outer portions and that as the blank is compressed between the face-dies the shaping of the blank to the configuration of the die-faces is progressive from the outer portions of the blank inwardly.

In the accompanying drawings I have shown several illustrative types of stopper-tops which embody the principles of the present invention, and certain parts of a convenient and suitable apparatus for practicing the method which I shall now describe.

The blanks from which the stopper-tops are made are cut from straight grained wood, and it is only desirable that the wood be properly selected, of good quality and well seasoned. I have obtained the best results with maple and beech, but woods having similar properties as these woods may be used. The stick or bar of wood from which the blanks are cut should be of the same cross-section throughout its length in order that blanks cut therefrom may be of substantially the same cross-sectional area. Whether the cross-section of a bar or stick be circular or rectangular is dependent upon the shape of the stopper-top desired to be made, but ordinarily it is not necessary that the edges of the sticks be rounded for providing the finished stopper-tops with rounded corners.

In the drawings I have illustrated a number of various shapes of stopper-tops, the blanks for some of which were cut from sticks having rectangular cross-sections and for others of which the blanks were cut from sticks having circular cross-sections, the sticks varying in size depending upon the form which the stopper-top is to take. All of the blanks are slices cut crosswise of the grain of the wood with the grain running along the narrowest dimension of the blanks.

So far as the manufacturing operation is concerned the blanks may be placed between the dies as cut from a plain stick, but if, for any reason such as for producing a particular finish, it is desirable that the blanks be stained or impregnated with such fillers as shellac or paraffin before the embossing operation takes place, such procedure is permissible without departing from the method disclosed herein or affecting the production of the stopper-tops of this invention. Also, the blanks may be stained, dyed or colored with suitable stain or pigment if a finish other than "natural wood" is desired. However, I have found that for many cases fancy tops which are to be used for cologne bottles and for other bottles having ornamental uses, it is frequently desired that such stopper-tops be colored with some bright color such as blue, rose, or gold. For such uses, I have found it desirable to make the stopper-tops by embossing them in their natural state and then subsequently applying a finish such as colored japan or lacquer. Then again, it may be desirable to waterproof the blanks and in that event some waterproofing material such as a suitable wax may be impregnated within the blank before the blank is embossed.

Figure 1:
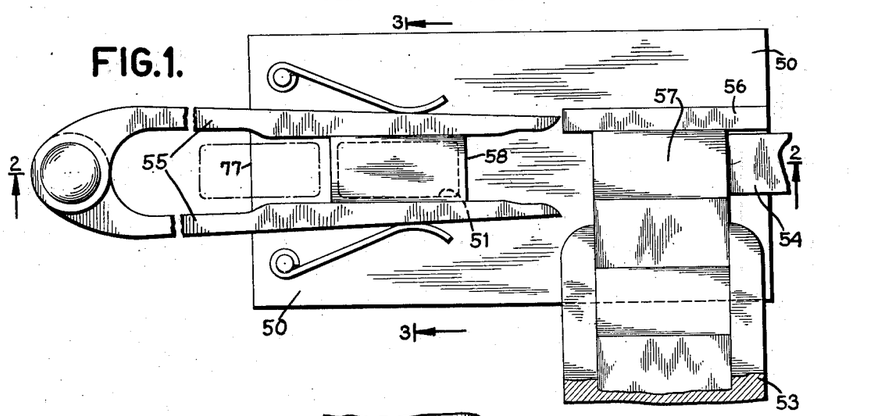
Fig. 1 is a plan, somewhat diagrammatic in character, of certain operative parts of the preferred apparatus for making my improved stopper-tops.
Figures 2, 3:
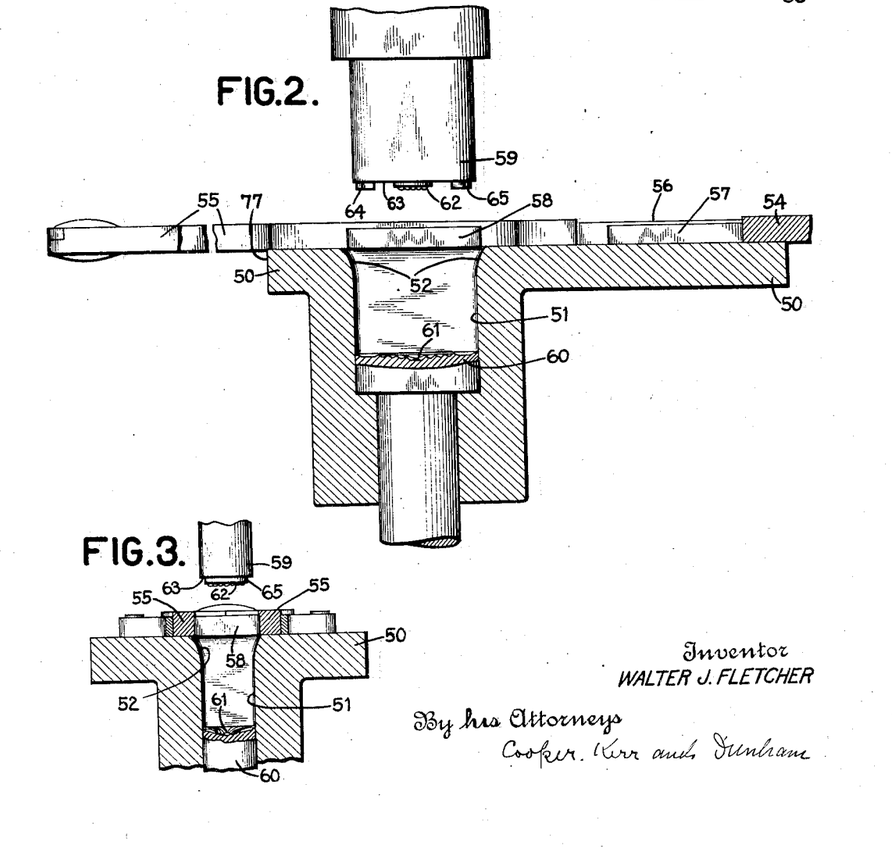
Fig. 2 is a section on line 2—2 of Fig. 1 with the lower die partly broken away, and including an upper die.
Fig. 3 is a section on line 3—3 of Fig. 1 with the lower die partly broken away, and including the upper die.
Figure 4:
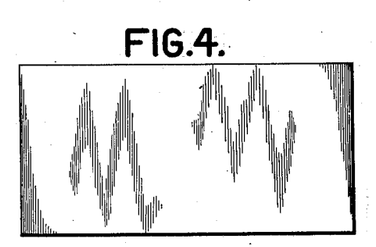
Figs. 4, 5, 6 and 7, are respectively, the plan and bottom view and elevations of an oblong blank of a comparatively large size.
Figure 5:
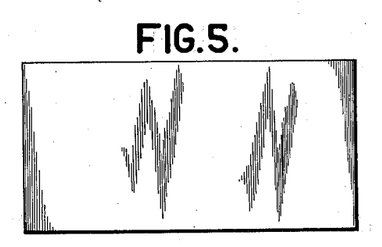
Figure 6:
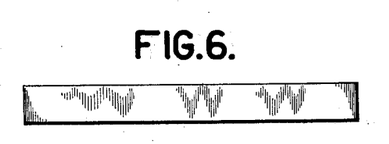
Figure 7:
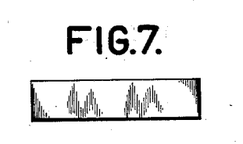
Figure 8:
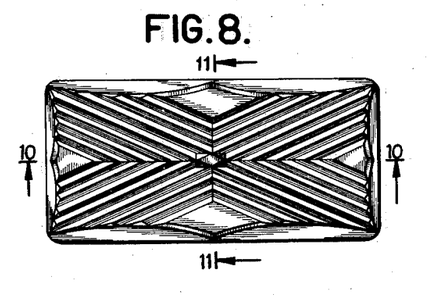
Figs. 8 and 9 are, respectively, the obverse and reverse of a stopper-top made from the oblong blank illustrated in Figs. 4, 5, 6 and 7.

The apparatus shown in Figs. 1 and 2 comprises a table or plate 50 having a die-hole 51 within which a blank is forced. The cross-sectional area of this die-hole is of less area than the area of the blank which is to be formed into a stopper-top. In the interest of simplicity and clarity of disclosure I have illustrated in Figs. 1, 2 and 3 a die-hole and opposite dies which are suitable for the manufacture of the stopper-top illustrated in Figs. 8, 9, 10 and 11 from the blank illustrated in Figs. 4, 5, 6 and 7. It should be understood that similar arrangements with appropriate dies may be used for the production of other forms of stopper-tops of my invention, some of which have been illustrated in the accompanying drawings.

The die-hole of Figs. 1, 2 and 3 is rectangular, has rounded corners and has a converging mouth 52 which facilities the entry of the blank therein. Its principal function, however, is to cooperate in the application of lateral or radial compression. The slope of the converging mouth of the die-hole is such as to cause the lateral compression of the blank to be applied at a sufficiently gradual rate to eliminate the element of shock or excessive strain. This feature of design will be referred to hereinafter.

The blanks are fed intermittently to the table from a chute 53 and a reciprocating pusher 54 is provided for moving successive blanks to the arms of a gripper 55 comprising a pair of spring-pressed jaws straddling the die-hole 51. The inward movement of the pusher is of such extent as to leave the blank directly over and coaxial with the aforesaid die-hole 51 in which position it is held by the gripper.

The longitudinal rib 56 may be provided on the plate 50 to guide the blank in its movement toward the gripper jaws. As the pusher moves in, it advances the first blank indicated at 57. Upon its retraction the next blank moves into position against the rib. With a blank 58 in position over the die-hole 51, the upper or cameo-die 59 descends and forces the blank down into the die-hole and compresses the blank powerfully upon the lower die 60 which has an intaglio engraving 61 upon its embossing surface. The inner surface (or surfaces) of the die-hole, which is made of material of suitable hardness and durability, such as hardened steel, is highly polished and provides a smooth finish for the edges of the stopper-tops, whereas the embossing areas of the upper and lower dies, which are likewise made of suitable material, are cut so as to give the desired impressions and reliefs in the finish desired.

The first compression which is applied to the blank occurs as the blank is forced into the converging mouth of the die-hole 51 and it is readily appreciated that the degree of compression produced is dependent upon the difference in areas of the size of the blank and the cross-sectional area of the die-hole. In order to produce a sound stopper-top having a relief and decorative obverse formed by an intaglio and a central impression on its reverse side, it is desirable that the initial lateral compression of the blank be high. For preventing excessive strains from occurring in localized portions of the blank when the initial lateral compression is applied, the converging mouth 52 of the die-hole 51 should extend an appreciable distance before vanishing into the wall of the die-hole.

My investigation has indicated that the initial compression applied to the blank as it is forced by the upper die through the converging mouth is of a complex nature involving lateral or radial compression as well as some endwise or axial compression. While the nature of the compression applied is probably variable with different forms of blanks, consideration must be given to the balancing of pressures within the blanks in order to avoid excessive shearing stresses as the blank is entering the die-hole. Probably the maximum limit for such stresses which may not be exceeded, is less for wafer-like blanks than for thicker blanks. The upper die is the force providing element by which the blank is forced within the die-hole and laterally compressed, and it is necessary that suitable and proper support be provided the blank as the upper die acts upon the blank while forcing it into the die-hole.

Referring particularly to Figs. 1, 2 and 3 elevation 62 in the upper die 59, which produces the recess for receiving the stopper, comes into contact with the upper surface of the blank prior to the base finishing area 63 of the upper die. Therefore, in order to properly support the blank as it is being introduced within the die-hole provision is made for protecting the blank from stresses which would otherwise cause cracking or excessive flexing accompanied by internal strains. Elevations 64 and 65 are provided for this purpose and for the purpose of causing proper distribution of the material of the blank when the relief on the obverse side of the blank is being impressed by the intaglio 61. The dies illustrated in Figs. 2 and 3 are the dies by which the stopper-top illustrated in Figs. 8, 9, 10 and 11 may be embossed, and it should be observed that for this form and configuration of stopper-top elevations 64 and 65 extend above surface 63 a greater distance than the central elevation 62. Elevations 64 and 65 strike the upper surface of the blank first with the result that a slight longitudinal variation in the blank takes place. Also, because the converging mouth of the die-hole exerts a vertical component of force, the fibers contacted by and in the vicinity of elevations 64 and 65 undergo an endwise compression as well as lateral compression. The wooden blank is laterally compressed and simultaneously axially compressed adjacent its periphery while the central portion of the blank is comparatively free.

The combined effect of these two conditions is to maintain the longitudinal or normal axis substantially unchanged or at least within limits beyond which shearing or cracking because of flexure may occur, and to contribute to the maintaining of the proper distribution of forces throughout the blank as it is being forced through the converging mouth of the die-hole. Although particular reference has been made to the purpose and design of the elevations or cameo-dies which are used for producing the impressions in the reverse side of the stopper-top of Figs. 8, 9, 10 and 11, elevations having corresponding characteristics, though in varying degrees, are used for effecting similar results in connection with the production of other forms of stopper-tops.

Elevations 64 and 65, or those corresponding thereto, must also be of such height and proportion with respect to elevation 62 as to produce the proper displacement of material without permitting cracking or the occurrence of internal weaknesses when the obverse side of the stopper-top is embossed. For example, the production of a stopper-top having a high relief, such as any one of those shown in Figs. 18, 37 and 41, and, in a lesser degree perhaps, in the production of stopper-tops illustrated in Figs. 31 and 34, require especial consideration of this aspect of the problem. Some of the many forms of stopper-tops which may be made in accordance with the principles of this invention have been illustrated, and while their general proportions and shapes vary considerably, the criteria set forth herein are applicable to the method of producing in one operation an embossed stopper-top consisting of a piece of wood having a relief on one side formed by an intaglio and impressions on its other side.

Figure 10:
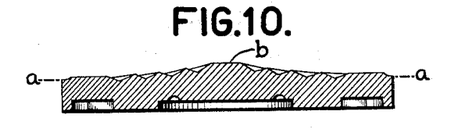
Figs. 10 and 11 are, respectively, longitudinal and lateral central cross-sections of the stopper-top illustrated in Figs. 8 and 9 on lines 10—10 and 11—11, respectively, in Fig. 8.
Figure 11:
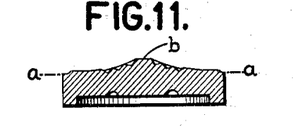
Figure 12:
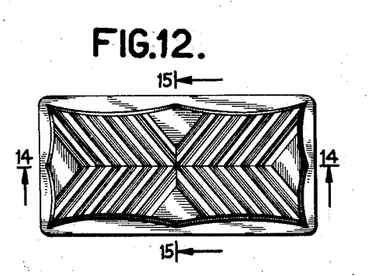
Figs. 12 and 13 are, respectively, the obverse and reverse of a stopper-top of modified size and form.

Referring more particularly to Figs. 10 and 11, it should be noted that the relief which is formed by the intaglio extends above the border which meets the vertical edges of the stopper-top in plane $a$—$a$ and that the material of the wood has been compacted in the vicinity of the border as well as within the border. The material forming the crest at $b$ has been displaced a considerable amount in the direction of the grain of the wood, but incipient cracks have been obviated as a result of the matting together of the fibers.

Figure 14:
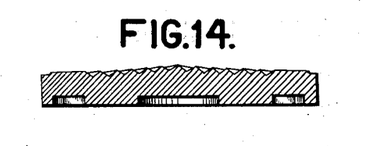
Figs. 14 and 15 are, respectively, longitudinal and lateral central cross-sections of the stopper-top illustrated in Figs. 12 and 13 on lines 14—14 and 15—15, respectively, in Fig. 12.
Figure 15:
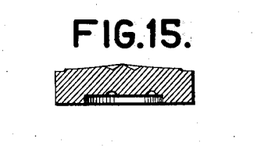
Figure 16:
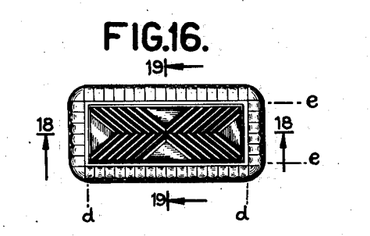
Figs. 16 and 17 are, respectively, the obverse and reverse of a small and deep oblong stopper-top.
Figure 18:
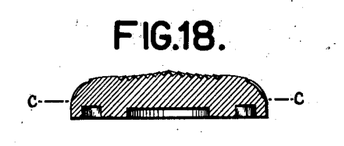
Figs. 18 and 19, respectively, are longitudinal and lateral central cross-sections of the stopper-tops illustrated in Figs. 16 and 17 on lines 18—18 and 19—19, respectively, in Fig. 16.
Figure 19:
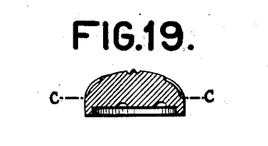
Figure 20:
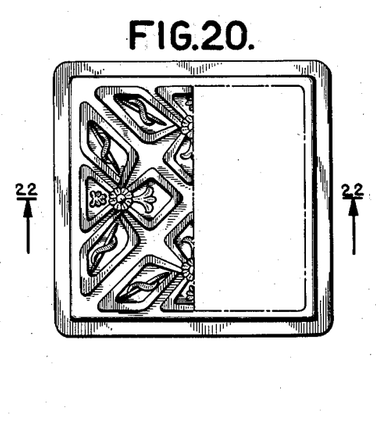
Figs. 20 and 21 are, respectively, the obverse and reverse of a large square form of stopper-top.

The stopper-top shown in Figs. 18 and 19 has a high relief throughout a large area and this relief is produced by an intaglio which is complementary to the cameo extending above the plane identified as $c$—$c$, Similarly, as for the obverse of the stopper-tops of Figs. 10 and 11 and of Figs. 14 and 15, the direction of the fibers within the area $(d$—$d)$—$(e$—$e)$, Fig. 16, are distorted and matted by compression while the fibers within and adjacent the rounded bordering area above plane $c$—$c$, Figs. 18 and 19, are compacted and displaced from their original positions a considerable amount. As in other stopper-tops made in accordance with this invention, the distortion of the fibers and the distribution of the material for producing a sound stopper-top is dependent upon the relation of the opposite dies.

Figure 21:
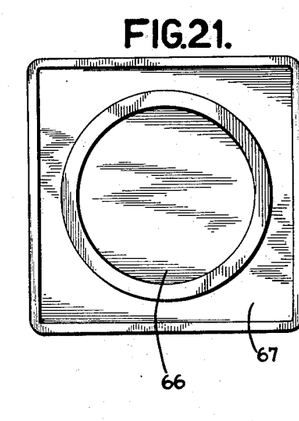
Figure 22:
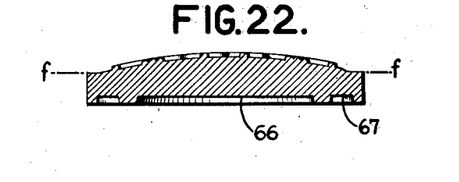
Fig. 22 is a central cross-section of the stopper-top illustrated in Figs. 20 and 21 on line 22—22 in Fig. 20.
Figure 23:
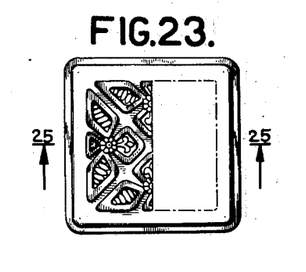
Figs. 23 and 24 are, respectively, the obverse and reverse of a small square form of stopper-top.
Figure 24:
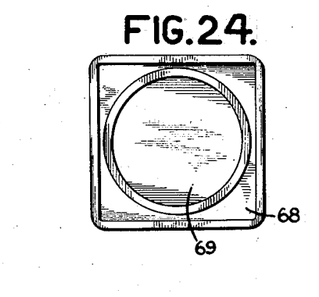

The stopper-top shown in Fig. 22 has a convex cameo above the plane $f$—$f$ and the figuring thereon is in high relief. In the manufacture of this stopper-top as well as in the manufacture of the stopper-top of Fig. 25, the upper die, in addition to having a cameo-die for forming the stopper recess 66, has a single cameo-die in place of the two cameo-dies 64, 64 (Fig. 2) for supporting the blank and for distributing the material thereof as required for strength and for producing the design. By such cameo-dies impression 67, Fig. 21, and impression 68, Fig. 24, are formed.

Figure 25:
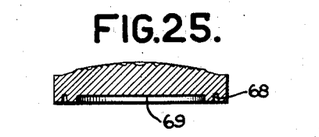
Fig. 25 is a central cross-section of the stopper-top of Figs. 23 and 24 on line 25—25 in Fig. 23.
Figure 26:
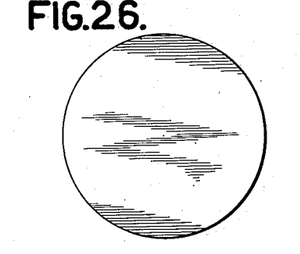
Figs. 26 and 27 are, respectively, opposite sides of a large and thin blank or disk.
Figure 27:
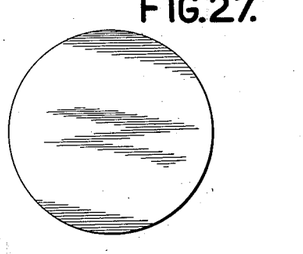
Figure 28:
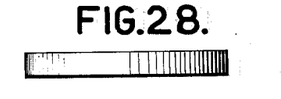
Fig. 28 is an elevation of the disk illustrated in Figs. 26 and 27.
Figure 29:
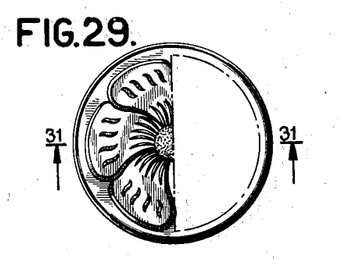
Figs. 29 and 30 are, respectively, the obverse and reverse of a stopper-top made from the blank or disk illustrated in Figs. 26, 27 and 28.
Figure 30:
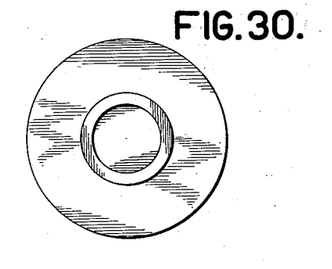

The figures in the relief of the stopper-top of Fig. 25 are not as bold as those of the stopper-top of Fig. 22, but, as is well shown in Fig. 25, the counter-sunk area 68 on the reverse side is made to extend to within the same distance of each edge even though the diameter of the recess 69 is nearly as large as the lateral dimension of area 68. The corners of the square areas of the blanks are supported when the blank is forced into the die-hole and a border of substantially uniform hardness and strength is produced.

Figure 31:
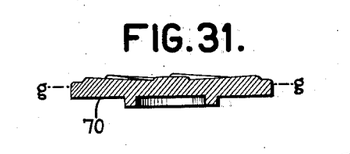
Fig. 31 is a central cross-section of the stopper-top of Figs. 29 and 30 on line 31—31 in Fig. 29.
Figure 32:
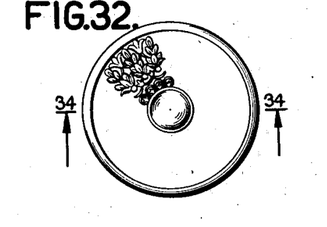
Figs. 32 and 33 are, respectively, the obverse and reverse of a smaller wafer-like form of stopper-top.
Figure 33:
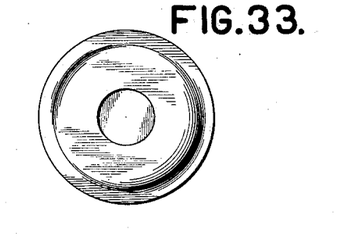
Figure 34:
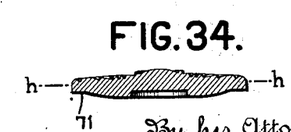
Fig. 34 is a central cross-section of the stopper-top illustrated in Figs. 32 and 33 on line 34—34 in Fig. 32.

For producing the stopper-tops of Figs. 31 and 34 the intaglios are countersunk to include all of the areas above planes $g$—$g$ and $h$—$h$, respectively. It will be noted that the intaglios distort the fibers at the edge so as to make rounded edges, and that while the relief is being embossed the reverse side of the blanks are supported by cameo-dies which bear upon and form surfaces 70, 71, of the respective stopper-tops.

Figures 35, 36, 37:
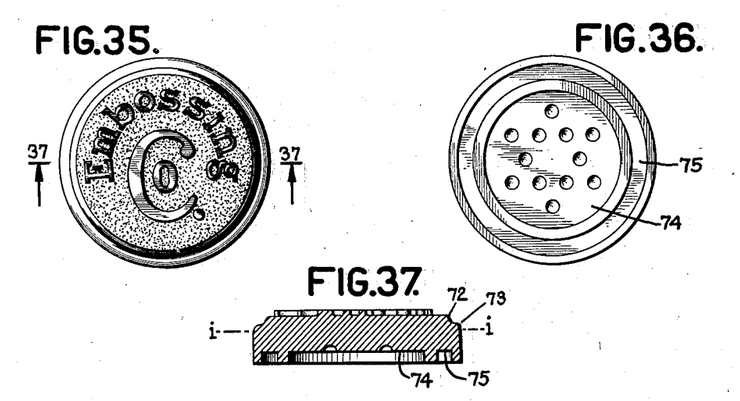
Figs. 35 and 36 are, respectively, the obverse and reverse of a modified form of stopper-top having a high relief and clearly defined letters thereon.
Fig. 37 is a central cross-section of the stopper-top illustrated in Figs. 35 and 36 on line 37—37 in Fig. 35.
Figure 38:
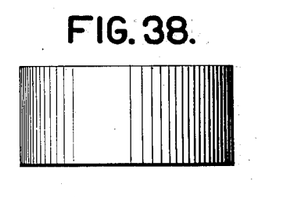
Figs. 38, 39 and 40 pictorially illustrate a blank and different instantaneous states of compression of a stopper-top in the process of manufacture.

The relief of the stopper-top of Fig. 37 extends to plane $i$—$i$ and the double shoulders 72 and 73 are formed and reinforced as the fibers constituting the same are being compressed as the result of the coaction of the intaglio and the cameo-dies. The intaglio embosses the shoulders and high relief while the cameo-dies form impressions 74, 75.

Figure 39:
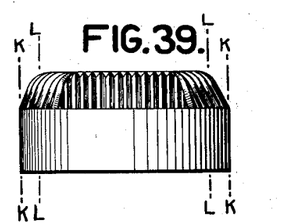
Figure 40:
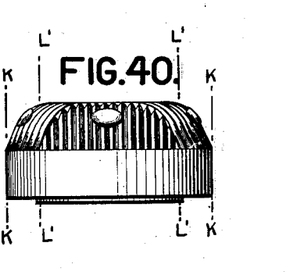
Figure 41:
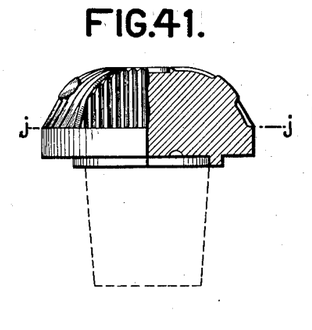
Fig. 41 illustrates, partly in section, the dome-shaped stopper-top made from the blank of Fig. 38.
Figure 42:
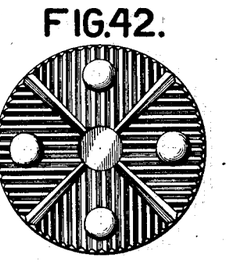
Figs. 42 and 43 are, respectively, the obverse and reverse of the stopper-top illustrated in Fig. 41.
Figure 43:
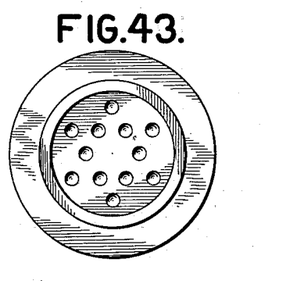

The relief of the dome-shaped stopper-top shown in Fig. 41, as formed by an intaglio, extends above plane $j$—$j$. In Figs. 39 and 40 I have illustrated instantaneous conditions existing during the embossing of the dome-shaped stopper-top. It is apparent that as the dome is being embossed concentric circles of shear which start at the edge k—k advance toward the axis of the dome. The location of two such circles of shear are generally designated as l—l in Fig. 39 and as l'—l' in Fig. 40. The tremendous lateral as well as axial pressure exerted by the intaglio in cooperation with the cameo-die gradually distorts and compresses the fibers so as to mat together the material into a hardened stress resisting mass as the embossing operation proceeds with the result that cracks may not be propagated therethrough.

In view of the distortion and compacting of fibers which takes place, heat is generated and possibly the destruction of the cellulose structure of the wood is accompanied with a redistribution of the pitchy and resinous substances of the wood with the result that the fibers are bonded together into a hardened compacted mass of the form desired. It should be clear that the number of forms of stopper-tops embodying the principles of the present invention are extensive and that those illustrated have been selected merely as representative of the general class of stopper-tops which may be manufactured with an undertanding of the principle which I have set forth herein.

As illustrated in Fig. 2, the lower die 60 is firmly seated upon the lower surface of the die-hole 51 and it need not be moved until after the stopper-top has been formed following the final movement of the upper die 59. The stopper-top is embossed in one operation and after the upper die 59 has reached its lowest point of descent both dies rise, the lower die just far enough to carry the finished top above the plate 50 and into engagement with the gripper 55 by which it is held as the lower die descends to its original position at the lower portion of the die-hole 51. The pusher then advances another blank which latter pushes the finished top forward from its position over the mouth of the die-hole. As the operation proceeds the finished tops fall over the forward edge 77 of the plate or table into a suitable receptacle, not shown.

Figure 9:
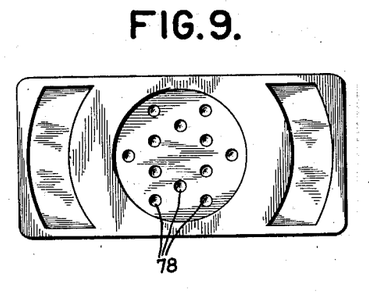
Figure 13:
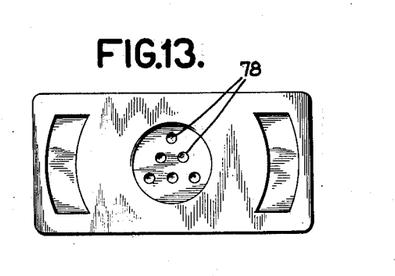
Figure 17:
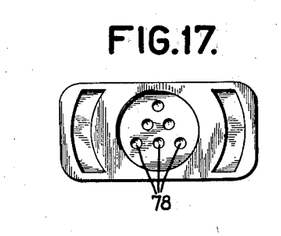

In order to give the utmost security of attachment of the top to the cork or other stopper the recess formed in the reverse side may have its surface pitted or provided with a plurality of small pits or recesses as indicated, for example, at 78 in Figs. 9, 13 and 17. The glue or other adhesive used to affix the stopper to the stopper-top penetrates into the recesses 78 and numerous lugs or dowels, so to speak, are formed thereby which effectually resist the shearing stress incident to the removal of a stopper from a bottle. While the use of pits results in an important economy in the saving of the amount of glue used, it is apparent that if it is desired the pits need not be formed. In any event the idea of using pits forms no part of the present invention but may be availed of.

For the purpose of disclosing the invention I have illustrated certain parts of a convenient and suitable apparatus in which the intaglio and cameo-die are referred to as the lower and upper dies respectively, and in which the upper die moves toward the lower die during an embossing operation, but I wish it to be understood, however, that the relative positions of the dies may be varied in that the cameo-die can be so arranged as to move upwardly or in any other direction in order to enter the die-hole, and that the invention is not limited to the details herein specifically described, but can be practiced in other ways without departure from its spirit as defined by the following claims.

What I claim is:

1. The method of making wooden stopper-tops comprising, forming a wood-blank having obverse and reverse surfaces which are substantially parallel to each other and perpendicular to the grain of the wood and having a periphery consisting of a surface substantially perpendicular to the obverse and reverse surfaces, compressing said blank laterally by forcing it into a die-hole in a direction axial of the grain of the blank, said blank being forced into the die-hole by a cameo-die having elevations for embossing a desired impression on the reverse surface of the blank and for suitably supporting the blank adjacent the walls of the die-hole so as to prevent cracking thereof when the blank is being laterally compressed, and embossing the obverse surface of the blank with a die cut in intaglio for producing a relief design as the reverse surface is being embossed.

2. The method of making stopper-tops comprising, forming a wood-blank having upper and lower surfaces which are substantially parallel to each other and perpendicular to the grain of the wood and having uniform cross-sections at all distances between the upper and lower surfaces, forcing the blank into a die-hole by a cameo-die bearing upon its upper surface, said cameo-die having elevations for embossing a desired impression on the upper surface and for suitably supporting the blank adjacent the walls of the die-hole so as to prevent cracking thereof when the blank is being forced into the die-hole by the movement of the cameo-die, and forcing the lower surface of the blank into contact with an intaglio for producing a relief design on the lower surface at the same time that the cameo-die is embossing the upper surface.

3. The method of making stopper-tops comprising, forming a wood-blank having upper and lower surfaces which are substantially parallel to each other and perpendicular to the grain of the wood and having uniform cross-sections at different distances between the upper and lower surfaces, forcing said blank into a die-hole in a direction axial of the grain of the blank for compressing the grain of the blank laterally, said blank being forced into the die-hole by a die having elevations for embossing desired impressions on the upper surface of the blank, at least one of which elevations is near the edge of the blank for supporting the blank as it is forced into the die-hole, and embossing the lower surface of the blank with a relief design while the upper surface of the blank is being embossed with impressions.

4. The method of making stopper-tops having upper and lower surfaces which are substantially perpendicular to the grain of the wood comprising, forming a wood-blank having upper and lower surfaces of substantially equal areas, forcing said blank into a die-hole of less cross-sectional area than the area of the upper surface or lower surface of the blank whereby the grain of the wood is compressed laterally, said blank being forced into the die-hole by a die having a central elevation and at least one elevation between the central elevation and the edge of the blank for supporting the blank so as to prevent cracking thereof when being forced into the die-hole, and concurrently embossing the upper surface of the blank with impressions and the lower surface of the blank in relief by axially compressing the blank without causing shearing or cracking thereof.

5. The method of making stopper-tops comprising, forming a wood-blank having equal rectangular upper and lower surfaces perpendicular to the grain of the wood and greater in area than the remaining surface area of the blank, forcing said blank into a die-hole in a direction axial of the grain of the blank for compressing the grain of the blank laterally, said blank being forced into the die-hole by a die having elevations for embossing desired impressions on the upper surface of the blank, one of said impressions being to seat a stopper and other of said impressions being formed by cameos for supporting the blank as it is forced into the die-hole, and embossing the lower surface of the blank with a relief design while the upper surface of the blank is being embossed with impressions.

6. The method of making stopper-tops comprising, forming a wood-disk having upper and lower surfaces which are substantially parallel to each other and perpendicular to the grain of the wood, forcing said disk into a die-hole of less cross-sectional area than the area of the disk whereby the grain of the wood and the disk is compressed radially, said disk being forced into the die-hole by a cameo-die having a central elevation and at least one elevation between the central elevation and the edge of the disk for supporting the disk so as to prevent cracking thereof when being forced into the die-hole, and concurrently embossing the upper surface of the disk with the cameo-die and the lower surface of the blank in relief by axially compressing the disk without causing shearing or cracking thereof.

7. The method of making a compressed wooden article which comprises laterally compressing a wooden blank and simultaneously axially compressing the blank adjacent its periphery while leaving the blank comparatively free at central portions of the opposite sides which are subsequently to be axially compressed over their entire areas, and subsequently further compressing the entire blank axially.

8. As a new article of manufacture, a stopper-top consisting of a piece of wood whose grain runs with the smallest dimension and which is compressed laterally of the grain and endwise of the grain and possesses configurations imparted by opposite dies, which configurations are embossed intaglio on one side and cameo on the other side.

9. As a new article of manufacture, a stopper-top consisting of a disk of wood compressed axially and radially and possessing on opposite sides configurations imparted by intaglio and cameo dies by such compression.

10. As a new article of manufacture, a stopper-top consisting of a piece of wood compressed to a volume less than its original blank size, said stopper-top having been compressed endwise of the grain and having embossed on its reverse side a central impression for seating a stopper and impressions near its edge, and on its obverse side a design in relief produced by an intaglio.

11. As a new article of manufacture, a rectangular wooden stopper-top compressed to a volume less than its original blank size and having an impression on its reverse side for receiving a stopper and impressions at the sides of said central impression and near the edges of the stopper-top, said stopper-top having a cameo design on its obverse side.

12. As a new article of manufacture, an oblong wooden stopper-top compressed laterally and axially and possessing configurations imparted by opposite dies, which configurations comprise ornamental relief on one side and a central impression and impressions at opposite ends of the stopper-top on the reverse side.

13. As a new article of manufacture, a wood stopper-top compressed to a volume less than its original blank size, said top having a cross-section curvilinear in outline and having on the reverse side a central impression for receiving a stopper and curvilinear impression near the edge, the obverse side of the stopper-top being of a relief design.

14. As a new article of manufacture, a rectangular wooden stopper-top compressed laterally and axially and possessing configurations imparted by opposite dies, which configurations comprise ornamental relief on one side and a central impression and a separate impression surrounding the central impression on the reverse side.

15. As a new article of manufacture, a wooden stopper-top having its fibres compacted by lateral and axial compression and the end-grain surfaces finished as the obverse side and the reverse side of the stopper-top, the obverse side comprising a surface in relief above the peripheral edge of the stopper-top, and the reverse side comprising a recess for receiving a cork, a border for said recess, and an area outside of the area of the border and impressed below the top of the border.

16. As a new article of manufacture, a wooden stopper-top compressed laterally and axially, said stopper top having for its obverse side a surface in relief above the peripheral edge of the stopper-top and having on its reverse side a cork-receiving impression and one or more impressions spaced from said cork-receiving impression.

17. As a new article of manufacture, an oblong stopper-top having on its obverse side a surface in relief rounding into the peripheral edge of the stopper-top and having on its reverse side a central impression and impressions on opposite sides of the central impression.

18. As an article of manufacture, a wooden stopper-top having on its obverse side a surface in relief rounding into the peripheral edge of the stopper-top and having on its reverse side a cork-receiving impression, and one or more impressions spaced from said cork-receiving impression.

In testimony whereof I hereto affix my signature.

WALTER J. FLETCHER.